Patented Sept. 29, 1931

1,825,288

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

VULCANIZATION OF RUBBER

No Drawing. Application filed April 24, 1929. Serial No. 357,881.

This invention relates to the vulcanization of rubber, caoutchouc and the like, and comprises a process in which there is used as a vulcanization accelerator a reaction product of an aldehyde derivative of a Schiff's base and the product formed by reacting a mercapto-aryl-thiazole such for example as mercapto-benzo-thiazole with a saturated organic base, for example hexa-methylene-tetramine. The invention will be understood from the following illustrations and examples.

One of the preferred class of compounds was prepared by heating substantially five parts of the aldehyde derivative of a Schiff's base formed by combining approximately three molar portions of acetaldehyde and approximately two molar portions of aniline prepared according to the method given in United States patent to C. O. North, No. 1,659,152 with substantially fifteen parts of the reaction product of approximately equimolar portions of mercapto-benzo-thiazole and hexa-methylene-tetramine. After the above ingredients were heated on an oil bath at a temperature of approximately 145–155° C. for about ten minutes a brittle resin was obtained. This material, designated as accelerator "A", was compounded in a rubber stock in the usual manner which was vulcanized and tested.

Another of the preferred class of accelerating compounds was prepared in the same manner as accelerator "A" with the exception that an aldehyde derivative of a Schiff's base was treated with a small amount of hydrochloric acid, then completely neutralized and further reacted with formaldehyde in the manner described in United States Patent No. 1,639,903 to Winfield Scott. Substantially five parts of this product were then added to substantially fifteen parts of the reaction product of approximately equimolar portions of mercapto-benzo-thiazole and hexa-methylene-tetramine and heated on an oil bath for approximately ten minutes at about 145 to 155° C. The material thus formed, designated as accelerator "B" is a brittle resin and was compounded in a rubber stock in the usual manner which was vulcanized and tested as hereinafter described.

Another of my preferred class of compounds, designated as accelerator "C", was prepared in the same manner as accelerator "A" with the exception that the acetaldehyde derivative of the Schiff's base ethylidene aniline as described was dehydrated and further reacted with formaldehyde. The material thus formed, on heating for substantially ten minutes at approximately 145 to 155° C. with the reaction product of substantially equimolar portions of mercapto-benzo-thiazole and hexa-methylene-tetramine, produced a brittle resin. This material likewise was compounded in a rubber stock which was vulcanized and tested.

Accelerators "A", "B" and "C" were separately compounded in the usual manner in a rubber stock comprising 100 parts of pale crepe rubber, 5 parts of zinc oxide, 3.5 parts of sulfur, 0.5 part of accelerator.

The rubber mixes thus obtained were then vulcanized by heating the rubber stocks in a press for the times and at the pressure conditions indicated in the following table in which are set forth the physical characteristics of the cured rubber stocks as determined by tests thereof.

| Accelerator | Time of cure | Modulus of elasticity at elongations of— | | | Tensile in lbs./in.² at break | Per cent ultimate elongation |
|---|---|---|---|---|---|---|
| | | 300% | 500% | 700% | | |
| "A" | 45 min. at 20 lbs. steam pressure | 247 | 602 | 2450 | 3905 | 805 |
| "B" | | 227 | 531 | 2150 | 3740 | 820 |
| "C" | | 225 | 516 | 1988 | 3345 | 805 |
| "A" | 15 min. at 40 lbs. steam pressure | 232 | 544 | 2090 | 3580 | 800 |
| "B" | | 221 | 482 | 1903 | 3698 | 830 |
| "C" | | 185 | 417 | 1445 | 3188 | 805 |
| "A" | 30 min. at 40 lbs. steam pressure | 251 | 617 | 2345 | 3695 | 775 |
| "B" | | 253 | 576 | 2288 | 3765 | 800 |
| "C" | | 225 | 547 | 2085 | 3473 | 805 |

Another example of the preferred class of compounds is shown by a product which was prepared by heating substantially equal weights of the reaction product of approximately three molar portions of butylaldehyde and substantially one molar portion of aniline and the reaction product of substantially equi-molar portions of mercapto-benzothiazole and hexa-methylene-tetramine. The above ingredients were heated on a steam bath for approximately six hours to form the desired product.

This product was compounded in the usual manner in a rubber stock comprising 100 parts of pale crepe rubber, 5 parts of zinc oxide, 3.5 parts of sulfur, 0.3 part of accelerator.

The rubber mix thus obtained was then vulcanized by heating the rubber stock in a press for different times and different pressures, as indicated in the following table in which are set forth the physical characteristics of the cured rubber stock.

| Time of cure | Modulus of elasticity at elongations of— | | | Tensile in lbs./in.² at break | Per cent ultimate elongation |
|---|---|---|---|---|---|
| | 300% | 500% | 700% | | |
| 40 min. at 20 lbs. steam pressure | 182 | 401 | 1640 | 2855 | 810 |
| 20 min. at 30 lbs. steam pressure | 167 | 392 | 1553 | 3020 | 840 |
| 30 min. at 30 lbs. steam pressure | 205 | 554 | 2370 | 3580 | 780 |

As seen from the data hereinbefore set forth, the preferred type of compounds form a class of rubber vulcanization accelerators of high merit which function satisfactorily at either low or high temperature cures.

Other aldehyde derivatives of Schiff's bases obtained by reacting aldehydes, such as heptaldehyde, propionaldehyde and the like with less than an equi-molecular proportion of various amines, such for example as butylamine, ethylamine, toluidine, xylidene and the like may be reacted with the reaction product of mercapto-aryl-thiazoles, for example, mercapto-tolyl-thiazole and the like, and aldehyde-amine condensation products as hexa-methylene-tetramine to form the preferred class of compounds.

The examples herein set forth are to be understood as illustrative only and not at all limitative of the invention. Other ingredients and other proportions of ingredients than those employed in the examples may be incorporated into rubber stocks designed for various types of products as are apparent from the foregoing, to one skilled in the art of rubber compounding. The invention is limited solely by the following claims attached hereto as a part of this specification.

What is claimed is:

1. The process of vulcanizing rubber comprising heating rubber and sulfur in the presence of the reaction product of an aliphatic aldehyde derivative of a Schiff's base and the product formed by reacting a mercapto-benzo-thiazole and hexa-methylene-tetramine.

2. The process of vulcanizing rubber comprising heating rubber and sulfur in the presence of the reaction product of an aliphatic aldehyde derivative of a Schiff's base and the product formed by reacting substantially equi-molar portions of a mercapto-benzo-thiazole and hexa-methylene-tetramine.

3. The process of vulcanizing rubber comprising heating rubber and sulfur in the presence of the reaction product of the acetaldehyde derivative of a Schiff's base and the product formed by reacting substantially equi-molar portions of a mercapto-benzo-thiazole and hexa-methylene-tetramine.

4. The process of vulcanizing rubber comprising heating rubber and sulfur in the presence of the material formed by reacting the product of substantially three molar portions of an aliphatic aldehyde with substantially two molar portions of aniline with the reaction product of substantially equi-molar portions of a mercapto-benzo-thiazole and hexa-methylene-tetramine.

5. The process of vulcanizing rubber comprising heating rubber and sulfur in the presence of the material formed by reacting the product obtained by combining substantially three molar portions of acetaldehyde with substantially two molar portions of aniline with the reaction product of substantially equi-molar portions of mercapto-benzo-thiazole and hexa-methylene-tetramine.

6. The process of vulcanizing rubber comprising heating rubber and sulfur in the presence of a material formed by heating substantially five parts of the reaction product of substantially three molar portions of acetaldehyde and substantially two molar portions of aniline with substantially fifteen parts of the reaction product of approximately equi-molar portions of mercapto-benzo-thiazole and hexa-methylene-tetramine.

7. The vulcanized rubber product obtained by heating rubber and sulfur in the presence of the reaction product of an aliphatic aldehyde derivative of a Schiff's base and the product formed by reacting substantially equi-molar portions of a mercapto-benzo-thiazole and hexa-methylene-tetramine.

8. The vulcanized rubber product obtained by heating rubber and sulfur in the presence of an aliphatic aldehyde derivative of a Schiff's base and the product formed by reacting substantially equi-molar portions of a mercapto-benzo-thiazole and hexa-methylene-tetramine.

9. The vulcanized rubber product obtained by heating rubber and sulfur in the presence of the reaction product of the acetaldehyde derivative of a Schiff's base and the product formed by reacting substantially equi-molar portions of a mercapto-benzo-thiazole and hexa-methylene-tetramine.

10. The vulcanized rubber product obtained by heating rubber and sulfur in the presence of the material formed by reacting the product formed by combining substantially three molar portions of an aliphatic aldehyde with substantially two molar portions of aniline with the reaction product of substantially equi-molar portions of a mercapto-benzo-thiazole and hexa-methylene-tetramine.

11. The vulcanized rubber product obtained by heating rubber and sulfur in the presence of the material formed by reacting the product obtained by combining substantially three molar portions of acetaldehyde with substantially two molar portions of aniline with the reaction product of substantially equi-molar portions of mercapto-benzo-thiazole and hexa-methylene-tetramine.

12. The vulcanized rubber product obtained by heating rubber and sulfur in the presence of a material formed by heating substantially five parts of the reaction product of substantially three molar portions of acetaldehyde and substantially two molar portions of aniline and substantially fifteen parts of the reaction product of approximately equi-molar portions of mercapto-benzo-thiazole and hexa-methylene-tetramine.

13. The process of vulcanizing rubber comprising heating rubber and sulfur in the presence of the reaction product of an aliphatic aldehyde derivative of a Schiff's base and the product formed by reacting a mercapto-benzo-thiazole and an aliphatic aldehyde-aliphatic amine reaction product.

14. The vulcanized rubber product obtained by heating rubber and sulfur in the presence of the reaction product of an aliphatic aldehyde derivative of a Schiff's base and the product formed by reacting a mercapto-benzo-thiazole and an aliphatic aldehyde-aliphatic amine condensation product.

In testimony whereof I hereunto affix my signature.

WINFIELD SCOTT.